3,037,991
3-INDOLYL-2-AMINOETHYLKETONES
AND THEIR PREPARATION
Jacob Szmuszkovicz, Portage Township, Kalamazoo
County, Mich., assignor to The Upjohn Company, Kalamazoo, Mich., a corporation of Michigan
No Drawing. Filed Oct. 29, 1958, Ser. No. 770,275
7 Claims. (Cl. 260—319)

The present invention relates to a novel process for the preparation of 3-indolyl 2-aminoethyl ketones and more especially to the preparation of 1-hydro-3-indolyl 2-aminoethyl ketone free bases, 1-alkyl-3-indolyl 2-aminoethyl free bases, 1-aminomethyl-3-indolyl 2-aminoethyl ketone free bases, and addition compounds thereof such as acid addition salts, quaternary ammonium salts, amine oxides, and amine oxide-acid addition salts. The invention also relates to novel 1-hydro-3-indolyl 2-aminoethyl ketone quaternary ammonium salts, and to novel 1-alkyl-3-indolyl 2-aminoethyl ketone free bases, 1-aminomethyl-3-indolyl 2-aminoethyl ketone free bases, and addition compounds thereof. This application is a continuation, in part of application Serial No. 529,911, filed August 22, 1955, now abandoned.

The term "hydro" as used herein indicates the presence of hydrogen in the 1-position in contrast to the 1-alkyl and 1-aminomethyl substituents.

The 1-alkyl-3-indolyl 2-aminoethyl ketones and 1-aminomethyl-3-indolyl 2-aminoethyl ketones of the present invention are produced by reacting a 1-alkyl-3-acylindole or 1-hydro-3-acylindole, respectively, containing a hydrogen atom alpha to the carbonyl group, with the appropriate quantity of an aliphatic aldehyde and a basic nitrogen compound as represented by ammonia or a primary or a secondary amine. The acyl substituent of the starting indole is from an alkanoic acid such as acetic acid, propionic acid, butyric acid, isobutyric acid, valeric acid, isovaleric acid, 2-ethylbutyric acid, 2-butylhexanoic acid, and the like. The use of ammonia results in the preparation of a primary amino-ketone and the use of a primary or secondary amine results in the production of a secondary or tertiary amino-ketone, respectively.

The 1-hydro-3-indolyl 2-aminoethyl ketones of the present invention are produced by subjecting the 1-aminomethyl-3-indolyl 2-aminoethyl ketones to alkaline hydrolysis.

The 3-indolyl 2-aminoethyl ketones produced by the novel process of the present invention can for the most part be represented by the following general formula:

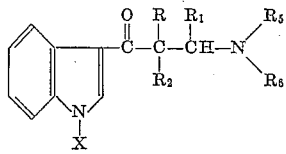

wherein R, $R_1$, and $R_2$ represent hydrogen and a loweralkyl radical containing from 1 to 4 carbon atoms such as methyl, ethyl, propyl, butyl, isobutyl, and the like. $R_5$ and $R_6$ taken individually represent hydrogen, aryl, aralkyl, and alkyl and together contain not more than 15 carbon atoms, and $R_5$ and $R_6$ taken together with

can also represent a heterocyclic amino radical, such as morpholinyl, piperidyl, pyrrolidyl, thiamorpholinyl, hexamethyleneimino, decahydroisoquinolyl, hexahydroisoquinolyl (both cis and trans), or the like. X presents hydrogen, a lower-alkyl radical containing from one to six carbon atoms such as methyl, ethyl, propyl, butyl, amyl, hexyl, and the like, and X further represents

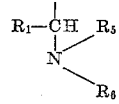

wherein $R_1$, $R_5$, and $R_6$ have the same values as noted above.

The 4-, 5-, 6-, and 7-positions of the benzene ring can include such substituents as hydrogen; hydroxy; halogen, e.g., chlorine, bromine, and the like; a benzyloxy radical, e.g., benzyloxy, benzhydryloxy, and the like; a loweralkoxy radical containing up to nine carbon atoms, e.g., methoxy, ethoxy, butoxy, octoxy, and the like; an acyloxy radical wherein the acyl substituent is from an organic carboxylic acid containing from one to eight carbon atoms, e.g., acetoxy, propionoxy, capryloxy, and the like. The 4-, 5-, 6-, and 7-position substituents can be alike or different but it is understood that hydrogen is located in the positions not occupied by other substituents. The 2-position can be occupied by hydrogen, a lower-alkyl radical containing from one to eight carbon atoms, e.g., methyl, ethyl, propyl, octyl, and the like; an aralkyl radical, e.g., benzyl, phenethyl, and the like; an aryl radical, e.g., phenyl, naphthyl, and the like.

The various 2-, 4-, 5-, 6-, and 7-substituted indoles which can be employed as starting compounds for the preparation of the 3-acylindoles can be prepared by utilizing the procedures outlined in U.S. Patent 2,825,734.

The starting 3-acylindoles can be prepared by the processes outlined in "Heterocyclic Compounds," Elderfield volume 3 page 44, 1952, John Wiley and Sons, Inc. For example, 3-indolyl methyl ketone can be prepared by reacting acetyl chloride with 3-indolylmagnesium iodide; 3-(2-methylindolyl) methyl ketone can be prepared by reacting 2-methylindole with acetic anhydride and sodium acetate.

1-alkyl-3-acylindoles can be prepared by utilizing the procedure of Baker, J. Chem. Soc. 1940, 458–60. For example, 1-alkyl-3-acylindoles can be prepared by reacting a 1-hydro-3-acylindole with an alkyl halide in the presence of an alkali-metal alkoxide.

In carrying out the process of the present invention for the preparation of the novel 1-alkyl-3-indolyl 2-aminoethyl ketones, a 1-alkyl-3-acylindole is reacted with an aliphatic aldehyde and a basic nitrogen compound as represented by ammonia, or a primary or secondary amine, in the presence of an inert solvent. It is preferred to employ equimolar quantities of reactants although other quantities can also be employed, if desired. The reaction is generally carried out under acid condition, i.e., a pH of less than seven. Various aliphatic aldehydes can be employed, e.g., aqueous formaldehyde, paraformaldehyde, acetyldehyde, butyraldehyde, isobutyraldehyde, valeraldehyde, and the like. Inert solvents can include methanol, ethanol, and isoamyl alcohol although when aqueous formaldehyde is employed no additional solvent is necessary. Various primary and secondary amines can be employed in the reaction such as the primary or secondary alkyl, cycloalkyl, aralkyl, and aryl amines, as well as heterocyclic amines. Representative amines include methylamine, dimethylamine, ethylamine, diethylamine, diisopropylamine, benzylamine, dibenzylamine, aniline, methylaniline, allylamine, piperidine, thiamorpholine, pyrrolidine, morpholine, and the like.

The acid conditions generally necessary for completion of the reaction can be brought about by adding the amine as an acid addition salt such as the hydrochloride, sulfate, hydrobromide, and the like. The acid conditions can also be brought about by the addition of an acid such as acetic, hydrochloric, phosphoric, sulfuric, hydrobromic, and the like, to the reaction mixture.

The reaction is carried out at a temperature between about fifty and about 100 degrees centigrade, advantageously at a temperature between about 65 and about 85 degrees centigrade. The reaction is generally completed after a period of about 24 hours.

In carrying out the process of the present invention for the preparation of the novel 1-aminomethyl-3-indolyl 2-aminoethyl ketones, a 1-hydro-3-acylindole is reacted with an aliphatic aldehyde and a basic nitrogen compound as represented by ammonia or a primary or secondary amine, employing substantially the same reaction conditions noted above. In those instances wherein a 1-hydro-3-acetylindole is employed as the starting compound it is necessary that at least twice the molar amount of an aliphatic aldehyde and basic nitrogen compound based on the starting 1-hydro-3-acetylindole be employed. In those instances wherein the starting compound is other than a 1-hydro-3-acetylindole it has surprisingly been found that the reaction will proceed even when the amounts of aliphatic aldehyde and basic nitrogen compound are much less than noted above, e.g., the desired 1-aminomethyl-3-indolyl 2-aminoethyl ketones are obtained by utilizing equimolar amounts of starting reactants. However, in order to improve the overall yield it is generally preferable to employ at least twice the molar amount of an aliphatic aldehyde and basic nitrogen compound based on the starting 1-hydro-3-acylindole.

The novel 1-hydro-3-indolyl 2-aminoethyl ketones of the present invention can be prepared by subjecting a 1-aminomethyl-3-indolyl 2-aminoethyl ketone to alkaline hydrolysis utilizing, for example, potassium hydroxide, sodium hydroxide, sodium carbonate, or potassium carbonate, and the like. The alkaline hydrolysis results in a cleavage of the 1-aminomethyl substituent.

Alternatively, the 1-hydro-3-acetylindoles can be employed as direct starting compounds for the preparation of the corresponding 1-hydro-3-indolyl 2-aminoethyl ketones. This can be most advantageously accomplished by utilizing equimolar quantities of reactants or by employing at least one of the other reactants (i.e., aliphatic aldehyde and basic nitrogen compounds) in an amount not substantially greater than equimolar based on the starting 1-hydro-3-acetylindole.

The thus-produced 3-indolyl 2-aminoethyl ketones can be recovered in a conventional manner from the reaction mixture. For example, the 3-indolyl 2-aminoethyl ketone acid addition salt precipitate can be recovered by filtration after cooling the reaction mixture. The free base can be recovered by dissolving the acid addition salt in water, extracting with ether, and adding excess alkali-metal hydroxide to the aqueous mixture. The resulting mixture can be extracted with ether and the ether extracts washed with a saturated salt solution. The washed product can thereupon be dried and the resulting dried mixture evaporated and triturated to produce the free base.

In some instances the acid addition salt is extremely soluble and will not readily precipitate upon cooling from the reaction mixture. In such cases, however, the acid addition salt can be recovered by evaporating the reaction solvent, adding water to the resulting reaction mixture, extracting the reaction mixture with ether, adding a cold solution of an alkali-metal hydroxide to the aqueous solution, extracting with chloroform, drying the chloroform extract over sodium sulfate, and evaporating the chloroform. The acid addition salt can then be isolated by adding the desired acid (e.g., hydrochloric, hydrobromic, sulfuric, acetic, tartaric, citric, and the like) to a chloroform solution of the free base.

The 3-indolyl 2-aminoethyl ketone N-oxides can be prepared by reacting the tertiary amine free base with an oxidizing agent such as hydrogen peroxide, peracetic acid, and 3-indolyl 2-aminoethyl ketone N-oxide acid addition salts can be prepared by reacting a 3-indolyl 2-aminomethyl ketone N-oxide dissolved, e.g., in ethyl alcohol-ethyl acetate, with an acid such as hydrochloric, hydrobromic, sulfuric, acetic, tartaric, citric, and the like.

The 3-indolyl 2-aminoethyl ketones can also be converted to novel and useful quaternary ammonium salts by reacting the tertiary amine free base in an inert solvent with a suitable quaternary ammonium salt-forming compound such as methyl iodide, ethyl bromide, octyl bromide, benzyl chloride, dimethyl sulfate, methyl paratoluene sulfonate, and the like. The 3-indolyl 2-aminoethyl ketone quaternary ammonium salts can for the most part be represented by the following general formula:

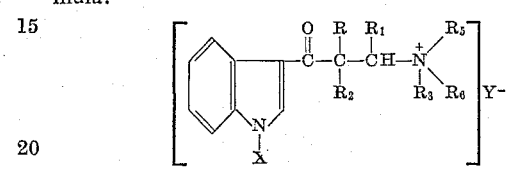

wherein X, R, $R_1$, and $R_2$ have the same values represented above. $R_5$, and $R_6$ taken individually represent aryl, aralkyl, and alkyl and together contain not more than fifteen carbon atoms, and when taken together with

represent a heterocyclic amino radical such as morpholinyl, piperidyl, pyrrolidyl, thiamorpholinyl, hexamethyleneimino, decahydroisoquinolyl, hexahydroisoquinolyl (both cis and trans), or the like. $R_5$ and $R_6$ together advantageously contain not more than fifteen carbon atoms. $R_3$ represents aralkyl and alkyl and advantageously contains not more than eight carbon atoms and Y represents an anion, such as a halogen anion, e.g., a chloride, iodide, or bromide anion; a sulfate anion, e.g., that derived from dimethyl sulfate; a para-toluenesulfonate anion, e.g., that derived from methyl para-toluenesulfonate, and the like. The 2-, 4-, 5-, 6-, and 7-positions can similarly be substituted as noted above.

The 3-indolyl 2-aminoethyl ketones produced by the novel process of the present invention have hypotensive and diuretic activity. In addition, the 1-alkyl-3-indolyl 2-aminoethyl ketones and 1-hydro-3-indolyl 2-aminoethyl ketones can be converted by lithium aluminum hydride to pharmacologically active 3-(3-aminopropyl)-indoles, e.g., 3-(3-dimethylaminopropyl)-indole can be produced by reducing 2-dimethylaminoethyl 3-indolyl ketone with lithium aluminum hydride in tetrahydrofuran. The 3-(3-aminopropyl)-indoles also have hypotensive activity.

Furthermore, the 3-indolyl 2-aminoethyl ketones can be reacted with fluosilicic acid to form the fluosilicate salts which in dilute aqueous solutions are effective mothproofing agents as more fully disclosed in U.S. Patents 2,075,359 and 1,915,334.

The novel 3-indolyl 2-aminoethyl ketone quaternary ammonium salts can be employed as intermediates for the preparation of auxins (plant growth substances, e.g., 2-dimethylaminoethyl 3-indolyl ketone methiodide can be reacted with sodium cyanide to produce 3-(γ-cyanopropionyl)-indole, the latter subjected to alkaline hydrolysis to produce the keto acid, and the latter reduced utilizing the procedure of Huang-Minlon [J. Am. Chem. Soc. 68, 2487 (1946)] to produce 3-indolebutyric acid ("Agricultural Chemistry," Frear, vol. 1, page 427, 1952, D. Van Nostrand Co.). The Huang-Minlon technique involves refluxing the ketone with diethylene glycol, hydrazine hydrate, and sodium hydroxide, distilling off the water and hydrazine hydrate to raise the temperature to 180 to 200 degrees centigrade and refluxing again for three to four hours. Alternatively, 3-indolebutyric acid can also be produced by subjecting the keto acid to hydrogenolysis utilizing five percent palladium on carbon in alcohol.

Moreover, the 1-alkyl-3-indolyl 2-aminoethyl ketones and 1-hydro-3-indolyl 2-aminoethyl ketones are also useful as tranquillizing agents, and drug potentiators, for example, in prolonging hexobarbital-induced sleeping time.

The following examples are illustrative of the process and products of the present invention, but are not to be construed as limiting.

EXAMPLE 1.—2-DIBENZYLAMINOETHYL 3-INDOLYL KETONE

A. *2-Dibenzylaminoethyl 3-Indolyl Ketone Hydrochloride*

A mixture of 4.35 g. of 3-indolyl methyl ketone (Saxton, J. Chem. Soc. 1952, 3592), 6.4 g. of dibenzylamine hydrochloride, 1.23 g. of paraformaldehyde and 41 ml. of absolute ethanol was refluxed for 24 hours. The solution was cooled to about 25° C. and crystallization thereupon occurred. The cooled mixture was filtered and the precipitate was washed with methanol and ether to yield 2-dibenzylaminoethyl 3-indolyl ketone hydrochloride which melted at 189 to 189.5° C.

*Anal.*—Calcd. for $C_{15}H_{25}N_2OCl$: Cl, 8.76. Found: Cl, 8.85.

B. *2-Dibenzylaminoethyl 3-Indolyl Ketone Free Base*

The hydrochloride from Part A was dissolved in water and extracted with ether. Excess potassium hydroxide was added to the aqueous mixture and the resulting mixture was extracted with ether. The resulting ether extract was washed with saturated sodium chloride solution, dried over anhydrous sodium sulfate, and evaporated to produce an oil. The resulting oil was triturated with ether-petroleum ether and recrystallized from benzene-petroleum ether to produce 2-dibenzylaminoethyl 3-indolyl ketone free base which melted at 130.5 to 132° C.

*Anal.*—Calcd. for $C_{25}H_{24}N_2O$: C, 81.49; H, 6.97; N, 7.61. Found: C, 81.38; H, 6.35; N, 7.78.

EXAMPLE 2.—DIMETHYLAMINOETHYL 3-(5-BENZYLOXYINDOLYL) KETONE

A. *3-(5-Benzyloxyindolyl) Methyl Ketone*

5-benzyloxyindole (11.15 g.; 0.05 mole) dissolved in 100 ml. of ether and 100 ml. of benzene was added during five minutes to a Grignard reagent prepared from magnesium (2.68 g.; 0.11 mole) and methyl iodide (17 g.; 0.12 mole). The mixture was refluxed for 75 minutes. It was then cooled in ice and 8.65 g. (0.11 mole) of acetyl chloride in 25 ml. of ether was added dropwise. The resulting mixture was stirred for three hours at about 25° C. The mixture was then cooled in ice and acidified with a solution of 15 ml. of acetic acid in 50 ml. of water. After stirring for 15 minutes the precipitate was filtered, washed with water and ether and suspended in 50 ml. of ethanol. A solution of 3 g. of potassium hydroxide in 10 ml. of water was added and the resulting solution was evaporated to about half its volume to yield 5.95 g. of 3-(5-benzyloxyindolyl) methyl ketone which was recrystallized from ethanol and melted at 188–190° C. Infrared and ultraviolet spectra were in accord with the proposed structure. The filtrate was evaporated further to yield an additional quantity of 3-(5-benzyloxyindolyl) methyl ketone.

*Anal.*—Calcd. for $C_{17}H_{15}NO_2$: C, 76.96; H, 5.70; N, 5.28. Found: C, 77.36; H, 5.43; N, 5.39.

B. *2-Dimethylaminoethyl 3-(5-Benzyloxyindolyl) Ketone Hydrochloride*

A mixture of 2.65 g. of 3-(5-benzyloxyindolyl) methyl ketone (0.01 mole), 0.98 g. of dimethylamine hydrochloride (0.012 mole), 0.6 g. of paraformaldehyde and 25 ml. of absolute ethanol was refluxed for 26 hours. Crystals appeared after a few hours of refluxing. The mixture was allowed to stand for 12 hours and was then cooled in ice, filtered, and washed with cold methanol and ether to yield 2.48 g. of 2-dimethylaminoethyl 3-(5-benzyloxyindolyl) ketone hydrochloride. The hydrochloride was recrystallized twice by dissolving in 75 ml. of absolute ethanol and evaporating to 40 ml. The recrystallized hydrochloride melted at 199.5—200.5° C.

*Anal.*—Calcd. for $C_{20}H_{23}N_2O_2Cl$: C, 66.93; H, 6.46; N, 7.81; Cl, 9.88. Found: C, 67.36; H, 6.86; N, 8.05; Cl, 9.82.

C. *2-Dimethylaminoethyl 3-(5-Benzyloxyindolyl) Ketone Free Base*

The hydrochloride from Part B was reacted with potassium hydroxide in the same manner as shown in Example 1, Part B, to produce 2-dimethylaminoethyl 3-(5-benzyloxyindolyl) ketone free base.

EXAMPLE 3.—2-DIMETHYLAMINOETHYL 3-INDOLYL KETONE

A. *2-Dimethylaminoethyl 3-Indolyl Ketone Free Base*

A mixture of 3-indolyl methyl ketone (15.9 g.; 0.1 mole), dimethylamine hydrochloride (8.15 g.; 0.1 mole), paraformaldehyde (4.5 g.; 0.15 mole) and 150 ml. of absolute ethanol was refluxed for 24 hours. The clear brown solution was allowed to stand at 25° C. for 24 hours and was then evaporated under vacuum to a viscous oil. Water (200 ml.) was added and the mixture was filtered. The aqueous filtrate was extracted twice with ether. The clear aqueous solution was then cooled in ice and made alkaline with a cold solution of potassium hydroxide (10 g.) in 25 ml. of water. The resulting oil was extracted thrice with chloroform and the chloroform extracts were washed twice with saturated sodium chloride solution, and dried over anhydrous sodium sulfate. The chloroform was removed by evaporation to produce 13.1 g. of 2-dimethylaminoethyl 3-indolyl ketone free base. The compound melted at 116 to 118.5° C. and had the following analysis:

*Anal.*—Calcd. for $C_{13}H_{16}N_2O$: C, 72.19; H, 7.46; N, 12.96. Found: C, 72.37; H, 7.28; N, 12.72.

B. *2-Dimethylaminoethyl 3-Indolyl Ketone Hydrochloride*

To a chloroform solution of 2-dimethylaminoethyl 3-indolyl ketone free base was added gaseous hydrogen chloride and the resulting precipitate, 2-dimethylaminoethyl 3-indolyl ketone hydrochloride, melted at 179–180° C. and had the following analysis:

*Anal.*—Calcd. for $C_{13}H_{17}ClN_2O$: C, 61.77; H, 6.78; Cl, 14.03; N, 11.09. Found: C, 61.36; H, 6.93; Cl, 13.97; N, 10.69.

C. *2-Dimethylaminoethyl 3-Indolyl Ketone Methiodide*

Methyl iodide (1.42 g.; 0.01 mole) was added to a solution of 1.08 g. of 2-dimethylaminoethyl 3-indolyl ketone free base, in 6 ml. of methanol cooled in ice. The mixture was allowed to stand in the cold for four hours. The mixture was filtered and the precipitate washed with cold methanol to produce 1.53 g. of 2-dimethylaminoethyl 3-indolyl ketone methiodide which melted at 205.5–207.5° C. (87 percent yield).

*Anal.*—Calcd. for $C_{14}H_{19}N_2IO$: C, 46.94; H, 5.35; N, 7.82; I, 35.43. Found: C, 47.03; H, 5.50; N, 7.58; I, 35.39.

EXAMPLE 4.—3-(3-DIMETHYLAMINOPROPYL)-INDOLE

A solution of 2-dimethylaminoethyl 3-indolyl ketone hydrochloride, Example 3, part B (1 g. in 10 ml. of tetrahydrofuran), was added to a suspension of lithium aluminum hydride (0.5 g.) in 25 ml. of tetrahydrofuran. The mixture was stirred for 15 minutes at 25° C. and refluxed for 1.5 hours. The mixture was allowed to stand for twelve hours and thereupon water and 50 ml. of 10 percent potassium hydroxide solution was added. The mixture was extracted three times with methylene chloride. The combined extracts were washed with ten percent sodium chloride solution, dried over anhydrous sodium sulfate and evaporated. The resulting oil was crystallized from benzene-petroleum ether and was recrystallized from Skellysolve B (mixture of hexanes) to produce 3-(3-dimethylaminopropyl)-indole which melted at 92–95° C.

*Anal.*—Calcd. for $C_{13}H_{18}N_2$: C, 77.18; H, 8.97; N, 13.85. Found: C, 76.96; H, 8.65; N, 14.18.

EXAMPLE 5.—3-INDOLEBUTYRIC ACID

A solution of sodium cyanide (0.735 g.) in 8 ml. of water was added to a suspension of 1.52 g. of 2-dimethylaminoethyl 3-indolyl ketone methiodide, prepared as disclosed in Example 3, part C, in 8 ml. of methanol. A slow stream of nitrogen was bubbled through the solution during the reaction. All the material dissolved in about one-half hour and crystallization started. The reaction was allowed to proceed for 19 hours. An equal volume of water was then added, and the product, 3-(γ-cyanopropionyl)-indole, was filtered and washed with water. The product weighed 0.5 gram (59.6 percent yield), and melted at 206–211° C. Two recrystallizations from methanol afforded pale yellow needles which melted at 212–214° C.

*Anal.*—Calcd. for $C_{12}H_{10}N_2O$: C, 72.75; H, 5.09; N, 14.14. Found: C, 72.52; H, 4.90; N, 14.38.

The ketocyanide was hydrolyzed with aqueous methanolic alkali to γ-(3-indolyl)-γ-oxo-butyric acid, melting point 235–238° C. (from acetone).

*Anal.*—Calcd. for $C_{12}H_{11}NO_3$: C, 66.35; H, 5.11; N, 6.45. Found: C, 66.35; H, 5.14; N, 6.26.

The γ-(3-indolyn)-γ-oxo-butyric acid was reduced utilizing the Huang-Minlon technique (loc. cit.) to produce 3-indolebutyric acid.

EXAMPLE 6.—2-DIBENZYLAMINOETHYL 3-INDOLYL KETONE ETHIODIDE

In the same manner as shown in Example 3, part C, 2-dibenzylaminoethyl 3-indolyl ketone ethiodide was prepared by reacting 2-dibenzylaminoethyl 3-indolyl ketone free base (Example 1, part B) with ethyl iodide.

EXAMPLE 7.—2-DIMETHYLAMINOETHYL 3-(5-BENZYLOXYINDOLYL) KETONE BENZYL CHLORIDE

In the same manner as shown in Example 3, part C, 2-dimethylaminoethyl 3 - (5 - benzyloxyindolyl) ketone benzyl chloride was prepared by reacting 2-dimethylaminoethyl 3-(5-benzyloxyindolyl) ketone free base (Example 2, part C) with benzyl chloride.

EXAMPLE 8.—2-DIMETHYLAMINOETHYL 3-INDOLYL KETONE N-OXIDE

A mixture of hydrogen peroxide and 2-dimethylaminoethyl 3-indolyl ketone free base, Example 3, part A, in methyl alcohol was shaken for twenty hours. The mixture was allowed to stand for four days whereupon an aqueous slurry of platinum-on-charcoal was added to decompose the excess hydrogen peroxide. When oxygen evolution had ceased the mixture was shaken for about five hours, filtered, and the filtrate evaporated to dryness. The crystalline residue was recrystallized from ethyl acetate to yield 2-dimethylaminoethyl 3-indolyl ketone N-oxide.

EXAMPLE 9. — 2-DIMETHYLAMINOETHYL 3-INDOLYL KETONE N-OXIDE HYDROCHLORIDE 2-dimethylaminoethyl 3-indolyl ketone N-oxide hydrochloride was produced by dissolving 2-dimethylaminoethyl 3-indolyl ketone N-oxide, Example 8, in ethyl alcohol-ethyl acetate and passing gaseous hydrogen chloride into the mixture.

EXAMPLE 10.—2-DIMETHYLAMINOETHYL 3-(1-METHYLINDOLYL) KETONE

A. *2-Dimethylaminoethyl 3-(1-Methylindolyl) Ketone Hydrochloride*

A mixture of 13.6 g. of 1-methyl-3-acetylindole [C.A. 49, 1006ᵈ (1955)], 6.4 g. of dimethylamine hydrochloride, 3.54 g. of paraformaldehyde, and 120 ml. of ethanol was refluxed for 24 hours. The solution was evaporated under vacuum and the resulting crude solid was recrystallized twice from methanol to yield 2-dimethylaminoethyl 3-(1-methylindolyl) ketone hydrochloride which melted at 185–186° C.

*Anal.*—Calcd. for $C_{14}H_{19}N_2ClO$: C, 63.03; H, 7.35; N, 10.50; Cl, 13.29. Found: C, 62.81; H, 6.93; N, 9.96; Cl, 13.33.

B. *2-Dimethylaminoethyl 3-(1-Methylindolyl) Ketone Free Base*

In the same manner as shown in Example 1, part B, 2-dimethylaminoethyl 3-(1-methylindolyl) ketone free base was prepared by reacting 2-dimethylaminoethyl 3-(1-methylindolyl) ketone hydrochloride with potassium hydroxide.

C. *2-Dimethylaminoethyl 3-(1-Methylindolyl) Ketone Methiodide*

In the same manner as shown in Example 3, Part C, 2-dimethylaminoethyl 3-(1-methylindolyl) ketone methiodide was prepared by reacting 2-dimethylaminoethyl 3-(1-methylindolyl) ketone free base with methyl iodide.

D. *2-Dimethylaminoethyl 3-(1-Methylindolyl) Ketone N-Oxide*

In the same manner as shown in Example 8, 2-dimethylaminoethyl 3-(1-methylindolyl) ketone N-oxide was prepared by reacting 2-dimethylaminoethyl 3-(1-methylindolyl) ketone free base with hydrogen peroxide.

E. *2-Dimethylaminoethyl 3-(1-Methylindolyl) Ketone N-Oxide Hydrochloride*

2-dimethylaminoethyl 3-(1-methylindolyl) ketone N-oxide hydrochloride was prepared by dissolving 2-dimethylaminoethyl 3-(1-methylindolyl) ketone N-oxide in ethyl alcohol-ethyl acetate and passing gaseous hydrogen chloride into the mixture.

EXAMPLE 11.—1 - DIMETHYLAMINOETHYL-3-INDOLYL 1-METHYL-2-DIMETHYLAMINOETHYL KETONE

A. *1-Dimethylaminomethyl-3-Indolyl 1-Methyl-2-Dimethylaminoethyl Ketone Free Base*

3-propionylindole was prepared in the same manner disclosed in Example 2A by substituting indole and propionyl chloride for 5-benzyloxyindole and acetyl chloride.

A mixture of 3.46 g. of 3-propionylindole (0.02 mole), 8.16 g. of dimethylamine hydrochloride (0.1 mole), 4.5 g. of paraformaldehyde (0.15 mole) and 70 ml. of absolute ethanol was refluxed for 28 hours. The mixture was evaporated to about 15 ml. and water was added which resulted in a precipitate consisting essentially of unchanged 3-propionylindole. The mixture was filtered and the filtrate was extracted twice with chloroform. The aqueous layer was made basic with ten percent aqueous potassium hydroxide solution and extracted with chloroform. The chloroform extracts were washed with saturated sodium chloride solution, dried over anhydrous sodium sulfate and evaporated to give 1.5 g. of 1-dimethylaminomethyl-3-indolyl 1-methyl-2-dimethylaminoethyl ketone free base as a yellow oil.

B. *1-Dimethylaminomethyl-3-Indolyl 1-Methyl-2-Dimethylaminoethyl Ketone Dihydrochloride*

The 1-dimethylaminomethyl-3-indolyl 1-methyl-2-dimethylaminoethyl ketone free base of Part A was dissolved in ether and an ethereal solution of hydrogen chloride was added. The precipitated dihydrochloride was purified by dissolving in five milliliters of methanol, and successively adding twenty milliliters of acetone and eighty milliliters of anhydrous ether. The yield of 1-dimethylaminomethyl-3-indolyl 1-methyl-2-dimethylaminoethyl ketone dihydrochloride thus obtained was 1.3 g. and the compound melted at 187–190° C.

Anal.—Calcd. for $C_{17}H_{27}N_3Cl_2O$: C, 56.66; H, 7.55; N, 11.66; Cl, 19.68. Found: C, 55.95; H, 7.22; N, 11.51; Cl, 19.49, 19.50.

EXAMPLE 12.—1 - DIMETHYLAMINOMETHYL-3-INDOLYL 2-DIMETHYLAMINOETHYL KETONE

A. *1-Dimethylaminomethyl-3-Indolyl 2-Dimethylaminoethyl Ketone Free Base*

A mixture of 31.8 g. of 3-indolyl methyl ketone (0.2 mole), 81.55 g. of dimethylamine hydrochloride (1.0 mole), and 45.6 g. of paraformaldehyde (1.52 moles) in 705 ml. of absolute ethanol was refluxed for 21 hours. A clear solution was obtained after two hours. The solution was then evaporated on the steam bath to give a light brown oil. 500 ml. of water was added, the solution was cooled in ice, and made basic (pH 8–9) with aqueous potassium carbonate solution. The mixture was extracted three times with ether (total 700 ml.). The ethereal solution was washed once with water, once with saturated sodium chloride solution, dried over anhydrous sodium sulfate and evaporated to produce 39.3 g. of oily 1-dimethylaminomethyl-3-indolyl 2-dimethylaminoethyl ketone free base.

Anal.—Calcd. for $C_{16}H_{23}N_3O$: C, 70.29; H, 8.48; N, 15.37; N. E., 136.69. Found: C, 69.79; H, 8.78; N, 15.01; N. E., 141.40.

B. *1-Dimethylaminomethyl-3-Indolyl 2-Dimethylaminoethyl Ketone Dihydrochloride*

In the same manner as disclosed in Example 11, Part B, 1-dimethylaminomethyl - 3 - indolyl 2-dimethylaminoethyl ketone dihydrochloride was produced utilizing 1-dimethylaminomethyl-3-indolyl 2-dimethylaminoethyl ketone free base in lieu of 1-dimethylaminomethyl-3-indolyl 1-methyl-2-dimethylaminoethyl ketone free base. The resulting compound melted at 184–187° C.

Anal.—Calcd. for $C_{16}H_{25}N_3OCl_2$: C, 55.49; H, 7.28; N, 12.13; Cl, 20.48; N.E., 173.1. Found: C, 54.72; H, 7.66; N, 12.41; Cl, 20.51; N.E., 182.2.

EXAMPLE 13.—3-INDOLYL 1-METHL-2-DIMETHYLAMINOETHYL KETONE FREE BASE

A solution of 1.95 g. of potassium hydroxide in 5 ml. of water was added to a solution of 1-dimethylaminoethyl-3-indolyl 1-methyl-2-dimethylaminoethyl ketone free base, Example 11, part A, in 12.5 ml. of methanol and the resulting solution was refluxed for one-half hour. The mixture was evaporated on the steam bath under vacuum and 20 ml. of water was then added. The resulting mixture was extracted three times with a total of 50 ml. of chloroform. The chloroform extracts were washed once with water and then three times with 10% hydrochloric acid (20, 10 and 10 ml. portions). The combined acid extracts were washed once with 10 ml. of chloroform and then poured into an ice-cold solution of 20 ml. of 25% aqueous potassium hydroxide solution. The resulting mixture was extracted three times with ether (total 150 ml.). The combined ethereal extracts were washed once with water, once with saturated sodium chloride solution, dried over anhydrous sodium sulfate and evaporated to give 0.543 g. of a yellow glassy solid. The product was recrystallized from a mixture of 3 ml. of ethyl acetate and 9 ml. of petroleum ether; 0.265 g. of 3-indolyl 1-methyl-2-dimethylaminoethyl ketone free base was thus obtained. The compound melted at 101–102° C.

Anal.—Calcd. for $C_{14}H_{18}N_2O$: C, 73.01; H, 7.88; N, 12.12; N.E., 230.3. Found: C, 72.99; H, 7.61; N, 11.74; N.E., 234.9.

The compound of this example when administered intraperitoneally to mice at a dosage of 20% of the $LD_{50}$ gave a 784% sleeping-time increase in the standard hexobarbital sleeping test. At half this dosage the time increase was 683%; at ¼ the dosage the time increase was 216%.

EXAMPLE 14.—1-DIMETHYLAMINOETHYL - 3-INDOLYL 1 - ETHYL-2 - DIMETHYLAMINOETHYL KETONE FREE BASE

A mixture of 6.77 g. (0.0362 mole) of 3-butyrylindole (Oddo et al., Beilstein 21,303), 14.8 g. (0.181 mole) of dimethylamine hydrochloride, 8.2 g. (0.273 mole) paraformaldehyde and 135 ml. of absolute ethanol was refluxed for 26 hours. The resulting yellow solution was evaporated on the steam bath and 60 ml. of water was added. The mixture was then filtered and the filtrate was extracted with three 50 ml. portions of ether, the remaining filtrate was cooled in ice, and then made basic with a solution of potassium carbonate (19 g. in 39 ml. of water). The mixture was extracted three times with 60 ml. portions of ether. The combined ether extracts were washed with water and then with saturated sodium chloride solution, dried over anhydrous sodium sulfate, and evaporated under vacuum to produce 2.94 g. of yellow oil which solidified after 12 hours. The product was recrystallized from isopropyl ether to produce 0.33 g. of 1-dimethylaminoethyl-3-indolyl 1-ethyl-2-dimethylaminoethyl ketone free base which melted at 78–80° C.

Anal.—Calcd. for $C_{18}H_{27}N_3O$: N, 13.99; N.E., 150.71. Found: N, 13.72; N.E., 149.00.

EXAMPLE 15.—1 - DIMETHYLAMINOMETHYL - 3-INDOLYL 1,1-DIMETHYL-2 - DIMETHYLAMINOETHYL KETONE

A. *1-Dimethylaminomethyl-3-Indolyl 1,1-Dimethyl-2-Dimethylaminoethyl Ketone Free Base*

3-isobutyrylindole was prepared in the same manner as disclosed in Example 2, part A, by substituting indole and isobutyryl chloride for 5-benzyloxyindole and acetyl chloride.

A mixture of 6.3 g. (0.0337 mole) of 3-isobutyrylindole, 13.8 g. (0.169 mole) of dimethylamine hydrochloride, 7.63 g. (0.254 mole) of paraformaldehyde and 126 ml. of absolute ethanol was refluxed for 24 hours. The resulting colorless solution was evaporated on the steam bath under vacuum. Sixty ml. of water was added and the mixture was filtered. The aqueous filtrate was extracted 3 times with 50 ml. portions of ether and then made basic with a solution of potassium carbonate (17.8 g. in 32 ml. of water). The alkaline solution was extracted 3 times with 60 ml. portions of ether. The combined ether extracts were washed with water and then with saturated sodium chloride solution, dried over anhydrous sodium sulfate and evaporated under vacuum. The resulting oil, 1-dimethylaminoethyl-3-indolyl 1,1-dimethyl-2-dimethylaminoethyl ketone free base, weighed 1.6 g.

B. *1-Dimethylaminoethyl-3-Indolyl 1,1-Dimethyl-2-Dimethylaminoethyl Ketone Dihydrochloride*

The oil of part A, 1-dimethylaminomethyl-3-indolyl 1,1-dimethyl-2-dimethylaminoethyl ketone free base, was dissolved in ether and converted to 1-dimethylaminomethyl-3-indolyl 1,1-dimethyl-2-dimethylaminoethyl ketone dihydrochloride with ethereal hydrogen chloride in the same manner disclosed in Example 11, part B.

EXAMPLE 16.—1-ETHYL-3-INDOLYL 2-DIMETHYLAMINOETHYL KETONE

A. *1-Ethyl-3-Indolyl 2-Dimethylaminoethyl Ketone Free Base*

A mixture of 49.32 g. of 1-ethyl-3-acetylindole (0.264 mole), 25.8 g. of dimethylamine hydrochloride (0.316 mole), and 15.85 g. of paraformaldehyde (0.528 mole) in 400 ml. of absolute ethanol was refluxed for 19 hours. The resulting solution was evaporated to dryness on the steam bath under vacuum. The residue was dissolved in 350 ml. of water and extracted twice with ether. The brown aqueous solution was cooled in ice and made basic with a solution of potassium hydroxide (33.6 g. in 110 ml. of water). The mixture was extracted three times with ether. The combined ethereal extracts were washed with saturated sodium chloride solution, dried over anhydrous sodium sulfate and evaporated to give 56 g. of 1-ethyl-3-indolyl 2-dimethylaminoethyl ketone free base.

B. *1-Ethyl-3-Indolyl 2-Dimethylaminoethyl Ketone Methiodide*

Fifteen grams of 1-ethyl-3-indolyl 2-dimethylaminoethyl ketone free base was dissolved in 65 ml. of methanol. The mixture was cooled in ice and 17.5 g. of methyl iodide was added. The mixture was kept in ice for one-half hour and then at 25° C. for 40 minutes. The crystals were filtered, washed with methanol and then with ether. The yield of 1-ethyl-3-indolyl 2-dimethylaminoethyl ketone methiodide was 20.6 g. and the compound melted at 192–194° C.

*Anal.*—Calcd. for $C_{16}H_{23}IN_2O$: C, 49.75; H, 6.00; I, 32.86; N, 7.25. Found: C, 49.61; H, 6.09; I, 32.51; N, 7.03.

EXAMPLE 17.—1-METHYL-3-INDOLYL 1-METHYL-2-DIMETHYLAMINOETHYL KETONE

A. *1-Methyl-3-Propionylindole*

A suspension of 51 g. of 3-propionylindole (0.295 mole) in 530 ml. of water and 52 g. of sodium hydroxide was heated to 70° C. on the steam bath. Heating was discontinued and 56 ml. of dimethyl sulfate was added during five minutes. Addition of dimethyl sulfate and sodium hydroxide was repeated two more times and the mixture was then heated at 95° C. for 2.5 hours. The oily layer solidified after 12 hours. The solid was recovered by filtration and washed with water. The product was dissolved in 800 ml. of ether, filtered from a brown impurity, and evaporated until crystallization started. The product, 1-methyl-3-propionylindole, weighed 40.15 g. and melted at 80–81.5° C.

*Anal.*—Calcd. for $C_{12}H_{13}NO$: C, 76.97; H, 7.00; N, 7.48. Found: C, 77.00; H, 6.80; N, 7.73.

B. *1-Methyl-3-Indolyl 1-Methyl-2-Dimethylaminoethyl Ketone Free Base*

A mixture of 9.35 g. of 1-methyl-3-propionylindole (0.05 mole), 20.4 g. of dimethylamine hydrochloride (0.25 mole), 11.3 g. of paraformaldehyde (0.375 mole) and 175 ml. of absolute ethanol was refluxed for 21 hours. The mixture was evaporated to dryness and the resulting oily solid was treated with 100 ml. of water, filtered, and washed with water. The aqueous filtrate was extracted twice with 100 ml. portions of ether and was then cooled in ice and made basic with a solution of 17 g. of potassium hydroxide in 50 ml. of water. The resulting mixture was extracted three times with 350 ml. of ether. The combined extracts were washed once with water, once with saturated sodium chloride solution, dried over anhydrous sodium sulfate and evaporated to give 4.0 g. of an oil which solidified on standing. The product, 1-methyl-3-indolyl 1-methyl-2-dimethylaminoethyl ketone free base, was recrystallized from Skellysolve B and melted at 79.5–80.5° C.

*Anal.*—Calcd. for $C_{15}H_{20}N_2O$: C, 73.73; H, 8.25; N, 11.47. Found: C, 74.00; H, 8.12; N, 11.48.

EXAMPLE 18.—1,2-DIETHYL-3-INDOLYL 2-ETHYL-2-DIETHYLAMINOETHYL KETONE

A. *1,2-Diethyl-3-Acetylindole*

In the same manner as disclosed in Example 2, part A, 1,2-diethyl-3-acetylindole was prepared utilizing 1,2-diethylindole (U.S. Patent 2,825,734) in lieu of 5-benzyloxyindole.

B. *1,2-Diethyl-3-Indolyl 2-Ethyl-2-Diethylaminoethyl Ketone Hydrochloride*

In the same manner as disclosed in Example 10, part A, 1,2-diethyl-3-indolyl 2-ethyl-2-diethylaminoethyl ketone hydrochloride was prepared using 1,2-diethyl-3-acetylindole, diethylamine hydrochloride, and propionaldehyde in lieu of 1-methyl-3-acetylindole, dimethylamine hydrochloride and paraformaldehyde.

C. *1,2-Diethyl-3-Indolyl 2-Ethyl-2-Diethylaminoethyl Ketone Free Base*

In the same manner as disclosed in Example 1, part B, 1,2-diethyl-3-indolyl 2-ethyl-2-diethylaminoethyl ketone free base was prepared by reacting 1,2-diethyl-3-indolyl 2-ethyl-2-diethylaminoethyl ketone hydrochloride with potassium hydroxide.

D. *1,2-Diethyl-3-Indolyl 2-Ethyl-2-Diethylaminoethyl Ketone Ethiodide*

In the same manner as shown in Example 3, part C, 1,2-diethyl-3-indolyl 2-ethyl-2-diethylaminoethyl ketone ethiodide was prepared by reacting 1,2-diethyl-3-indolyl 2-ethyl-2-diethylaminoethyl ketone free base with ethyl iodide.

EXAMPLE 19.—1,2-DIPROPYL-6-(PARA,PARA'-DIMETHYLBENZHYDRYLOXY)-3-INDOLYL 1,1-DIETHYL-2-PIPERIDINOETHYL KETONE

A. *1,2-Dipropyl-6-(Para,Para'-Dimethylbenzhydryloxy)-3-Indolyl 1,1-Diethyl-2-Piperidinoethyl Ketone Hydrochloride*

1,2-dipropyl-6-(para,para'-dimethylbenzhydryloxy)-3-(2-ethylbutyryl)-indole was prepared in the same manner disclosed in Example 2, part A, by substituting 2-ethylbutyryl chloride and 1,2-dipropyl-6-(para,para'-dimethylbenzhydryloxy)-indole (U.S. Patent 2,825,734) for acetyl chloride and 5-benzyloxyindole.

In the same manner as disclosed in Example 10, part A, 1,2 - dipropyl - 6-(para,para'-dimethylbenzhydryloxy)-3-indolyl 1,1-diethyl-2-piperidinoethyl ketone hydrochloride was prepared using 1,2-dipropyl-6-(para,para'-dimethylbenzhydryloxy)-3-(2-ethylbutyryl)-indole and piperidine hydrochloride in lieu of 1-methyl-3-acetylindole and dimethylamine hydrochloride.

B. *1,2 - Dipropyl-6-(Para,Para'-Dimethylbenzhydryloxy)-3-Indolyl 1,1-Diethyl-2-Piperidinoethyl Ketone Free Base*

In the same manner as disclosed in Example 1, part B, 1,2 - dipropyl - 6-(para,para'-dimethylbenzhydryloxy)-3-indolyl 1,1-diethyl-2-piperidinoethyl ketone free base was prepared by reacting 1,2-dipropyl-6-(para,para'-dimethylbenzhydryloxy)-3-indolyl 1,1-diethyl-2-piperidinoethyl ketone hydrochloride with potassium hydroxide.

C. *1,2 - Dipropyl-6-(Para,Para'-Dimethylbenzhydryloxy)-3-Indolyl 1,1-Diethyl-2-Piperidinoethyl Ketone Benzyl Chloride*

In the same manner as shown in Example 3, part C, 1,2 - dipropyl-6-(para,para'-dimethylbenzhydryloxy)-3-indolyl 1,1-diethyl-2-piperidinoethyl ketone benzyl chloride was prepared by reacting 1,2-dipropyl-6-(para,para'-dimethylbenzhydryloxy)-3-indolyl 1,1-diethyl-2-piperidinoethyl ketone free base with benzyl chloride.

EXAMPLE 20.—1 - (1 - DIBUTYLAMINOAMYL)-6-ACETOXY-3-INDOLYL 2-BUTYL-2-DIBUTYLAMINOETHYL KETONE

A *6-Acetoxy-3-Acetylindole*

In the same manner as disclosed in Example 2, part A, 6-benzyloxy-3-acetylindole was prepared utilizing 6-benzyloxyindole (J. Chem. Soc. 1937, 1726) in lieu of 5-benzyloxyindole.

The 6-benzyloxy-3-acetylindole was debenzylated according to the procedure disclosed in U.S. Patent 2,708,197 to produce 6-hydroxy-3-acetylindole. The resulting 6-hydroxy-3-acetylindole was acetylated with acetic anhydride at about 25° C. to produce 6-acetoxy-3-acetylindole.

B. *1-(1-Dibutylaminoamyl)-6-Acetoxy-3-Indolyl 2-Butyl-2-Dibutylaminoethyl Ketone Free Base*

In the same manner as disclosed in Example 11, part A, 1-(1-dibutylaminoamyl)-6-acetoxy-3-indolyl 2-butyl-2-dibutylaminoethyl ketone free base was prepared using 6-acetoxy-3-acetylindole, dibutylamine hydrochloride, and valeraldehyde in lieu of 3-propionylindole, dimethylamine hydrochloride, and paraformaldehyde.

C. *1-(1-Dibutylaminoamyl)-6-Acetoxy-3-Indolyl 2-Butyl-2-Dibutylaminoethyl Ketone Dihydrochloride*

The free base of part B was dissolved in ether and treated with ethereal hydrogen chloride to produce 1-(1-dibutylaminoamyl)-6-acetoxy-3-indolyl 2-butyl-2-dibutylaminoethyl ketone dihydrochloride. The resulting dihydrochloride was purified by dissolving in methanol, and successively adding acetone and anhydrous ether.

D. *1-(1-Dibutylaminoamyl)-6-Acetoxy-3-Indolyl 2-Butyl-2-Dibutylaminoethyl Ketone Bis-Ethiodide*

In the same manner as shown in Example 3, part C, 1-(1-dibutylaminoamyl)-6-acetoxy-3-indolyl 2-butyl-2-dibutylaminoethyl ketone bis-ethiodide was prepared by reacting 1-(1-dibutylaminoamyl)-6-acetoxy-3-indolyl 2-butyl-2-dibutylaminoethyl ketone free base with ethyl iodide.

EXAMPLE 21.—6-ACETOXY-3-INDOLYL 2-BUTYL-2-DIBUTYLAMINO-ETHYL KETONE FREE BASE

In the same manner as disclosed in Example 13, 6-acetoxy-3-indolyl 2-butyl-2-dibutylaminoethyl ketone free base was prepared by alkaline hydrolysis utilizing 1-(1-dibutylaminoamyl)-6-acetoxy-3-indolyl 2-butyl-2-dibutylaminoethyl ketone free base in lieu of 1-dimethyl-aminomethyl-3-indolyl 1-methyl-2-dimethylaminoethyl ketone free base.

EXAMPLE 22.—1 - (1 - BUTYLAMINOBUTYL) - 7 - METHOXY-3-INDOLYL 1,2-DIPROPYL-2-BUTYL-AMINOETHYL KETONE

A. *7-Methoxy-3-Valerylindole*

In the same manner as disclosed in Example 2, part A, 7-methoxy-3-valerylindole was prepared utilizing 7-methoxy-indole (C.A. 44, 604c) and valeryl chloride in lieu of 5-benzyloxyindole and acetyl chloride.

B. *1-(1-Butylaminobutyl)-7-Methoxy-3-Indolyl 1,2-Di-Propyl-2-Butylaminoethyl Ketone Free Base*

In the same manner as disclosed in Example 11, part A, 1 - (1 - butylaminobutyl)-7-methoxy-3-indolyl 1,2-dipropyl-2-butylaminoethyl ketone free base was prepared using 7-methoxy-3-valerylindole, butylamine hydrochloride and butyraldehyde in lieu of 3-propionylindole, dimethylamine hydrochloride, and paraformaldehyde.

C. *1-(1-Butylaminobutyl)-7-Methoxy-3-Indolyl 1,2-Dipropyl-2-Butylaminoethyl Ketone Dihydrochloride*

The free base of part B was dissolved in ether and treated with ethereal hydrogen chloride to produce 1-(1-butylaminobutyl) - 7 - methoxy-3-indolyl 1,2-dipropyl-2-butylaminoethyl ketone dihydrochloride. The resulting dihydrochloride was purified by dissolving in methanol, and successively adding acetone and anhydrous ether.

EXAMPLE 23.—7-METHOXY-3-INDOLYL 1,2-DIPROPYL-2-BUTYLAMINO-ETHYL KETONE FREE BASE

In the same manner as disclosed in Example 13, 7-methoxy-3-indolyl 1,2-dipropyl-2-butylaminoethyl ketone free base was prepared by alkaline hydrolysis utilizing 1-(1-butylaminobutyl)-7-methoxy-3-indolyl 1,2-dipropyl-2-butylaminoethyl ketone free base in lieu of 1-dimethyl-aminomethyl-3-indolyl 1-methyl - 2 - dimethylaminoethyl ketone free base.

EXAMPLE 24.—1 - DIPROPYLAMINOMETHYL - 2-PHENYL-5-CHLORO-3-INDOLYL 1-METHYL-2-DIPROPYLAMINOETHYL KETONE

A. *2-Phenyl-5-Chloro-3-Propionylindole*

In the same manner disclosed in Example 2, part A, 2-phenyl-5-chloro-3-propionylindole was prepared using 2-phenyl-5-chloroindole (J. Chem. Soc. 1948, 847) and propionyl chloride in lieu of 5-benzyloxyindole and acetyl chloride.

B. *1-Dipropylaminomethyl-2-Phenyl-5-Chloro-3-Indolyl 1-Methyl-2-Dipropylaminoethyl Ketone Free Base*

In the same manner as disclosed in Example 11, part A, 1-dipropylaminomethyl-2-phenyl-5-chloro-3-indolyl 1-methyl-2-dipropylaminoethyl ketone free base was prepared using 2-phenyl-5-chloro-3-propionylindole and dipropylamine hydrochloride in lieu of 3-propionylindole and dimethylamine hydrochloride.

C. *1-Dipropylaminomethyl-2-Phenyl-5-Chloro-3-Indolyl 1-Methyl-2-Dipropylaminoethyl Ketone Dihydrochloride*

The base of part B was dissolved in ether and treated with ethereal hydrogen chloride to produce 1-dipropylaminomethyl-2-phenyl-5-chloro-3-indolyl 1-methyl-2-dipropylaminoethyl ketone dihydrochloride. The resulting hydrochloride was purified by dissolving in methanol, and successively adding acetone and anhydrous ether.

D. *1-Dipropylaminoethyl-2-Phenyl-5-Chloro-3-Indolyl 1-Methyl-2-Dipropylaminoethyl Ketone Bis-Methosulfate*

In the same manner as shown in Example 3, part C, 1 - dipropylaminomethyl - 2 - phenyl-5-chloro-3-indolyl 1-methyl-2-dipropylaminoethyl ketone bis-methosulfate was prepared by reacting 1-dipropylaminomethyl-2-phenyl-5-chloro-3-indolyl 1-methyl-2-dipropylaminoethyl ketone free base with dimethyl sulfate.

EXAMPLE 25.—2-PHENYL-5-CHLORO-3-INDOLYL 1-METHYL-2-DIPROPYLAMINOETHYL KETONE FREE BASE

In the same manner as disclosed in Example 13, 2-phenyl-5-chloro-3-indolyl 1-methyl-2-dipropylaminoethyl ketone free base was prepared by alkaline hydrolysis utilizing 1 - dipropylaminomethyl-2-phenyl-5-chloro-3-indolyl 1-methyl-2-dipropylaminoethyl ketone free base in lieu of 1-dimethylaminomethyl-3-indolyl 1-methyl-2-dimethylaminoethyl ketone free base.

EXAMPLE 26.—1-HEXYL - 6 - BENZYLOXY-3-INDOLYL 2-BUTYL - 2 - METHYL-AMINOETHYL KETONE

A. *1-Hexyl-6-Benzyloxy-3-Acetylindole*

In the same manner as disclosed in Example 2, part A, 6-benzyloxy-3-acetylindole was prepared utilizing 6-benzyloxyindole in lieu of 5-benzyloxyindole. The resulting 6-benzyloxy-3-acetylindole was reacted with hexyl iodide in the manner disclosed by Baker, supra, to produce 1-hexyl-6-benzyloxy-3-acetylindole.

B. *1-Hexyl-6-Benzyloxy-3-Indolyl 2-Butyl-2-Methyl-Aminoethyl Ketone Hydrochloride*

In the same manner as disclosed in Example 10, part A, 1-hexyl-6-benzyloxy-3-indolyl 2-butyl-2-methylaminoethyl ketone hydrochloride was prepared using 1-hexyl-6-benzyloxy-3-acetylindole, methylamine hydrochloride and valeraldehyde in lieu of 1-methyl-3-acetylindole, dimethylamine hydrochloride, and paraformaldehyde.

C. *1-Hexyl-6-Benzyloxy-3-Indolyl 2-Butyl-2-Methyl-Aminoethyl Ketone Free Base*

In the same manner as disclosed in Example 1, part B, 1-hexyl-6-benzyloxy-3-indolyl 2-butyl-2-methylaminoethyl ketone free base was prepared by reacting 1-hexyl-6-benzyloxy-3-indolyl 2-butyl-2-methylaminoethyl ketone hydrochloride with potassium hydroxide.

The 1-hexyl-6-benzyloxy-3-indolyl 2-butyl-2-methylaminoethyl ketone free base was debenzylated utilizing palladium on charcoal in the manner disclosed in U.S. Patent 2,708,197 to produce 1-hexyl-6-hydroxy-3-indolyl 2-butyl-2-methylaminoethyl ketone free base.

EXAMPLE 27.—1-ETHYL-2-PHENYL-5-METHOXY-3-INDOLYL 2 - ETHYL - 2 - MORPHOLINOETHYL KETONE

A. *1-Ethyl-2-Phenyl-5-Methoxy-3-Acetylindole*

In the same manner as disclosed in Example 2, part A, 2-phenyl-5-methoxy-3-acetylindole was prepared utilizing 2-phenyl-5-methoxyindole (Bull. soc. chim. France, 1950, 551) in lieu of 5-benzyloxyindole. The resulting 2-phenyl-5-methoxy-3-acetylindole was reacted with ethyl iodide in the manner disclosed by Baker, supra, to produce 1-ethyl-2-phenyl-5-methoxy-3-acetylindole.

B. *1-Ethyl-2-Phenyl-5-Methoxy-3-Indolyl 2-Ethyl-2-Morpholinoethyl Ketone Hydrochloride*

In the same manner as disclosed in Example 10, part A, 1-ethyl-2-phenyl-5-methoxy-3-indolyl 2-ethyl-2-morpholinoethyl ketone hydrochloride was prepared using 1-ethyl-2-phenyl-5-methoxy - 3 - acetylindole, morpholine hydrochloride and propionaldehyde in lieu of 1-methyl-3-acetylindole, dimethylamine hydrochloride, and paraformaldehyde.

C. *1-Ethyl-2-Phenyl-5-Methoxy-3-Indolyl 2-Ethyl-2-Morpholinoethyl Ketone Free Base*

In the same manner as disclosed in Example 1, part B, 1-ethyl-2-phenyl-5-methoxy-3-indolyl 2-ethyl-2-morpholinoethyl ketone free base was prepared by reacting 1-ethyl-2-phenyl-5-methoxy-3-indolyl 2-ethyl - 2 - morpholinoethyl ketone hydrochloride with potassium hydroxide.

D. *1-Ethyl-2-Phenyl-5-Methoxy-3-Indolyl 2-Ethyl-2-Morpholinoethyl Ketone Propyl Iodide*

In the same manner as shown in Example 3, part C, 1-ethyl-2-phenyl-5-methoxy-3-indolyl 2 - ethyl-2-morpholinoethyl ketone propyl iodide was prepared by reacting 1-ethyl-2-phenyl-5-methoxy-3-indolyl 2 - ethyl-2-morpholinoethyl ketone free base with propyl iodide.

EXAMPLE 28.—2-ISOPROPYL - 2 - DIMETHYLAMINOETHYL 3-INDOLYL KETONE FREE BASE

In the same manner as disclosed in Example 3, part A, but substituting isobutyraldehyde for paraformaldehyde, 2-isopropyl-2-dimethylaminoethyl 3-indolyl ketone free base was prepared.

In the same manner as disclosed above other 3-indolyl 2-aminoethyl ketones can be prepared utilizing the proper quantity of reactants as disclosed above, for example, 1-(1-diethylaminoethyl)-6-benzyloxy-3-indolyl 1,2-dimethyl-2-diethylaminoethyl ketone free base,
6-benzyloxy-3-indolyl 1,2-dimethyl-2-diethylaminoethyl ketone free base,
1-butyl-3-indolyl 1-ethyl-2-pyrrolidinoethyl ketone hydrochloride,
3-indolyl 1-methyl-1-ethyl-2-piperidinoethyl ketone methiodide,
1-butyl-3-indolyl 1,2-dibutyl-2-morpholinoethyl ketone hydrochloride,
1-(1-dibutylaminobutyl)-6-methoxy-3-indolyl 1,1,2-tripropyl-2-dibutylaminoethyl ketone free base,
6-methoxy-3-indolyl 1,1,2-tripropyl-2-dibutylaminoethyl ketone free base,
3-indolyl 1-methyl-2-dimethylaminoethyl ketone hydrochloride,
3-indolyl 1-methyl-2-dimethylaminoethyl ketone hydrobromide,
3-indolyl 1-methyl-2-dimethylaminoethyl ketone sulfate,
3-indolyl 1-methyl-2-dimethylaminoethyl ketone acetate,
3-indolyl 1-methyl-2-dimethylaminoethyl ketone tartrate,
3-indolyl 1-methyl-2-dimethylaminoethyl ketone citrate,
1-(1-dibutylaminoamyl)-6-acetoxy-3-indolyl 2-butyl-2-dibutylaminoethyl ketone bis(N-oxide),
1-(1-dibutylaminoamyl)-6-acetoxy-3-indolyl 2-butyl-2-dibutylaminoethyl ketone bis(N-oxide)dihydrochloride,
and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 1 - dimethylaminomethyl - 3 - indolyl 1 - methyl-2-dimethylaminoethyl ketone.
2. 1-dimethylaminomethyl-3-indolyl 2-dimethylaminoethyl ketone.
3. 1-dimethylaminomethyl-3-indolyl 1-ethyl-2-dimethylaminoethyl ketone.
4. 1-dimethylaminomethyl-3-indolyl 1,1-dimethyl-2-dimethylaminoethyl ketone.
5. A process for the preparation of 1-hydro-3-indolyl 2-aminoethyl ketones having the formula:

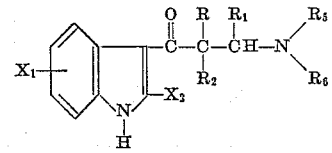

wherein $X_1$ is selected from the group consisting of hydrogen, benzyloxy, halogen, alkoxy up to 9 carbon atoms, and acyloxy wherein the acyl substituent is from an alkanoic acid of 1 to 8 carbon atoms, $X_2$ is selected from the group consisting of hydrogen, alkyl of 1 to 8 carbon atoms, benzyl, and phenyl, R, $R_1$, and $R_2$ are selected from the group consisting of hydrogen and lower-alkyl of 1 to 4 carbon atoms, and $R_5$ and $R_6$ are selected from the group consisting of hydrogen, phenyl, benzyl, and alkyl of 1 to 4 carbon atoms and $R_5$ and $R_6$ together with —N< form a heterocyclic amino selected from the group consisting of morpholinyl, piperidyl, pyrrolidyl, thiamorpholinyl and hexamethyleneimino which comprises the steps of heating at a temperature between about 50 and about 100° C. a 1-hydro-3-acylindole wherein the acyl substituent is derived from an alkanoic acid of 2 to 10 carbon atoms and which contains a hydrogen atom alpha to the carbonyl group with an alkanal of 1 to 5 carbon atoms and a basic nitrogen compound selected from the group consisting of ammonia, a primary amine, and a secondary amine, at a pH of less than seven, and further characterized in that when R and $R_2$ are hydrogen that at least twice the molar amount of alkanal and basic nitrogen compound based on the 1-hydro-3-acylindole are employed to produce a 1-aminomethyl-3-indolyl 2-aminoethyl ketone having the formula:

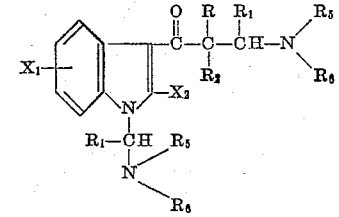

wherein $X_1$, $X_2$, R, $R_1$, $R_2$, $R_5$ and $R_6$ have the above values, and subjecting the thus produced 1-aminomethyl-3-indolyl 2-aminoethyl ketone to alkaline hydrolysis to produce the desired 1-hydro-3-indolyl 2-aminoethyl ketone.

6. 1-amino-3-indolyl 2-aminoethyl ketone having the formula:

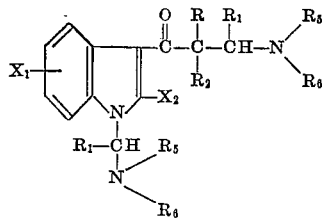

wherein $X_1$ is selected from the group consisting of hydrogen, benzyloxy, hydroxy, halogen, alkoxy up to 9 carbon atoms, and acyloxy wherein the acyl substituent is from an alkanoic acid of 1 to 8 carbon atoms, $X_2$ is selected from the group consisting of hydrogen, alkyl of 1 to 8 carbon atoms, benzyl, and phenyl, R, $R_1$ and $R_2$ are selected from the group consisting of hydrogen and lower-alkyl of 1 to 4 carbon atoms, and $R_5$ and $R_6$ are selected from the group consisting of hydrogen, phenyl, benzyl, and alkyl of 1 to 4 carbon atoms and $R_5$ and $R_6$ together with —N< form a heterocyclic amino selected from the group consisting of morpholinyl, piperidyl, pyrrolidyl, thiamorpholinyl, and hexamethyleneimino.

7. Quaternary ammonium compounds of the group consisting of those having the formula:

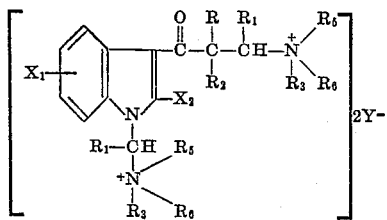

wherein $X_1$ is selected from the group consisting of hydrogen, benzyloxy, hydroxy, halogen, alkoxy up to 9 carbon atoms, and acyloxy wherein the acyl substituent is from an alkanoic acid of 1 to 8 carbon atoms, $X_2$ is selected from the group consisting of hydrogen, alkyl of 1 to 8 carbon atoms, benzyl, and phenyl, R, $R_1$, and $R_2$ are selected from the group consisting of hydrogen and lower-alkyl of 1 to 4 carbon atoms, $R_5$ and $R_6$ are selected from the group consisting of hydrogen, phenyl, benzyl, and alkyl of 1 to 4 carbon atoms and $R_5$ and $R_6$ together with —N< form a heterocyclic amino selected from the group consisting of morpholinyl, piperidyl, pyrrolidyl, thiamorpholinyl and hexamethyleneimino, $R_3$ is selected from the group consisting of benzyl and alkyl of not more than eight carbon atoms, and Y is an anion selected from the group consisting of halogen, sulfate, and para-toluenesulfonate.

References Cited in the file of this patent

UNITED STATES PATENTS

| 2,814,625 | Speeter | Nov. 26, 1957 |
| 2,821,532 | Anthony et al. | Jan. 28, 1958 |
| 2,849,454 | Szmuszkovicz | Aug. 26, 1958 |
| 2,877,234 | Szmuszkovicz | Mar. 10, 1959 |

FOREIGN PATENTS

| 829,895 | Germany | Jan. 31, 1952 |

OTHER REFERENCES

Salway: Jour. Chem. Soc., vol. 103, pages 351–60 (1913).

Organic Reactions, Adams, John Wiley and Son, New York, vol. 1, pages 308–309 (1942).

UNITED STATES PATENT OFFICE
CERTIFICATION OF CORRECTION

Patent No. 3,037,991            June 5, 1962

Jacob Szmuszkovicz

It is hereby certified that error appears in the above numbered patent requiring correction and that the said Letters Patent should read as corrected below.

Column 1, lines 13 and 14, after "2-aminoethyl" insert -- ketone --; column 5, line 20, for "$C_{15}H_{25}N_2OCl$" read -- $C_{25}H_{25}N_2OCl$ --; line 37, for "DIMETHYLAMINOETHYL" read -- 2-DIMETHYLAMINOETHYL --; column 10, line 1, for "1-DIMETHYLAMINOETHYL" read -- 1-DIMETHYLAMINOMETHYL --; lines 21 and 49, for "1-dimethylaminoethyl", each occurrence, read -- 1-dimethylaminomethyl --; same column 10, line 53, for "1-Dimethylaminoethyl", in italics, read -- 1-Dimethylaminomethyl --, in italics; column 14, line 31, for "1-Dipropylaminoethyl", in italics, read -- 1-Dipropylaminomethyl --, in italics; column 17, line 1, for "1-amino-3-indolyl" read -- 1-aminomethyl-3-indolyl --.

Signed and sealed this 16th day of October 1962.

(SEAL)
Attest:

ERNEST W. SWIDER
Attesting Officer

DAVID L. LADD
Commissioner of Patents